May 29, 1962  J. C. BUDDE  3,036,777
ADJUSTABLE THERMAL MIXING VALVE
Filed Sept. 27, 1956  2 Sheets-Sheet 1

INVENTOR.
JAMES CLARENCE BUDDE
BY
SMITH, OLSEN, LEWIS & McRAE
ATTORNEYS

May 29, 1962

J. C. BUDDE 3,036,777

ADJUSTABLE THERMAL MIXING VALVE

Filed Sept. 27, 1956

INVENTOR.
JAMES CLARENCE BUDDE
BY
SMITH, OLSEN, LEWIS & McRAE
ATTORNEYS

United States Patent Office 3,036,777
Patented May 29, 1962

3,036,777
ADJUSTABLE THERMAL MIXING VALVE
James Clarence Budde, Detroit, Mich., assignor, by mesne assignments, to American Radiator & Standard Sanitary Corporation, New York, N.Y., a corporation of Delaware
Filed Sept. 27, 1956, Ser. No. 612,535
4 Claims. (Cl. 236—12)

This invention relates to improvements in fluid mixing valves for mixing relatively hot and cold fluids and delivering them below a predetermined temperature. More particularly this has to do with an externally and internally controlled mixing valve which is adapted to supply fluid varying in temperatures ranging from cold to predetermined maximum hot. In particular, this invention provides an externally adjustable thermostatic fluid mixing valve for automatic washing machines and the like, wherein a minimum cold temperature, at least one intermediate temperature and a maximum hot temperature of the outlet fluid therein can be obtained.

In constructing mixing valves for use in home appliances and the like, it is necessary that such valves be manufactured at a comparatively low cost, and at the same time, such that they will meet the high standards expected by the purchasers and users of such appliances. The desire to reduce cost has led to the use in many instances of mixing valves from which thremostatic control means have been entirely eliminated. This step naturally occurred because of the added costs involved in making and installing such thermostatic controls.

However it has been found that variations in the hot and cold water pressure and temperatures to an automatic washing machine using a non-thermostatic type of valve frequently results in water temperatures which are too high for use with some of the synthetic fabrics being washed. Further, in automatic washing machines various mixed water temperatures are needed to soak, to wash, or to rinse a particular fabric. In the past, in order to provide a single thermostatic mixing valve which could deliver automatically such temperature ranges of water, it was necessary to have a mixing valve in which there was a solenoid operated thermostatic valve for each temperature range desired. These valves were relatively large and bulky. Further, several solenoids and thermostatic valves were required, as well as other parts. Therefore, it has been found necessary to develop a mixing valve for this purpose which will have the low cost features of non-thermostatic valves, which will be of lower cost and less bulky than the thermostatic valves formerly used, and which will be capable of delivering a controlled mixed water having temperatures varying from cold, to at least one intermediate temperature, to a maximum hot temperature which will not be injurious to the particular fabric being washed.

Thus it is an object of the present invention to provide an improved fluid mixing valve which is characterized by its relatively simple, low cost construction and effective operation.

It is another object of the present invention to provide an improved mixing valve of the foregoing character which is constructed and arranged so that it will operate as a non-thermostatic unit below a predetermined temperature, and which is adapted to operate at at least one thermostatically controlled temperature below a predetermined maximum temperature, and which includes a simple, relatively low cost, temperature control assembly for preventing the discharge temperature of the mixed fluid from exceeding either the predetermined maximum temperature or any control temperature below it.

It is a further object of this invention to provide in a fluid mixing valve of the foregoing character an externally adjustable thermosensitive device for operating a valve means which is adapted to control the flow of the hot and cold fluids so that at least three different predetermined temperatures can be obtained.

Still further it is an object of this invention to provide in a fluid mixing valve a mechanically adjustable thermostatic valve device for obtaining at least three different predetermined temperatures which has an internal member positioned in said valve which is thermosensitive to at least two different predetermined temperatures and connected to valve means for controlling the flow of hot and cold fluids, and an external positioning member which is mechanically actuated and adapted to position automatically the internal member so that when it is in a predetermined position it will position the valve means so that a predetermined mixed fluid temperature will be obtained.

It is a further object of this invention to provide a thermostatic power element assembly for fluid valves and the like which has at least two thermostatic power elements assembled together so that the assembly will exend and contract along an axis in response to changes in temperature which effect at least one of the thermostatic power elements.

It is still another object of the present invention to provide an improved fluid mixing valve of the foregoing character which has flow control means for maintaining fluid discharge at a substantially uniform rate.

Other objects of this invention will appear in the following description and appended claims, reference being had to the accompanying drawings forming a part of this specification wherein like reference characters designate corresponding parts in the several views.

The figures illustrate a preferred embodiment of this invention, partially in section and with portions broken away.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 2:
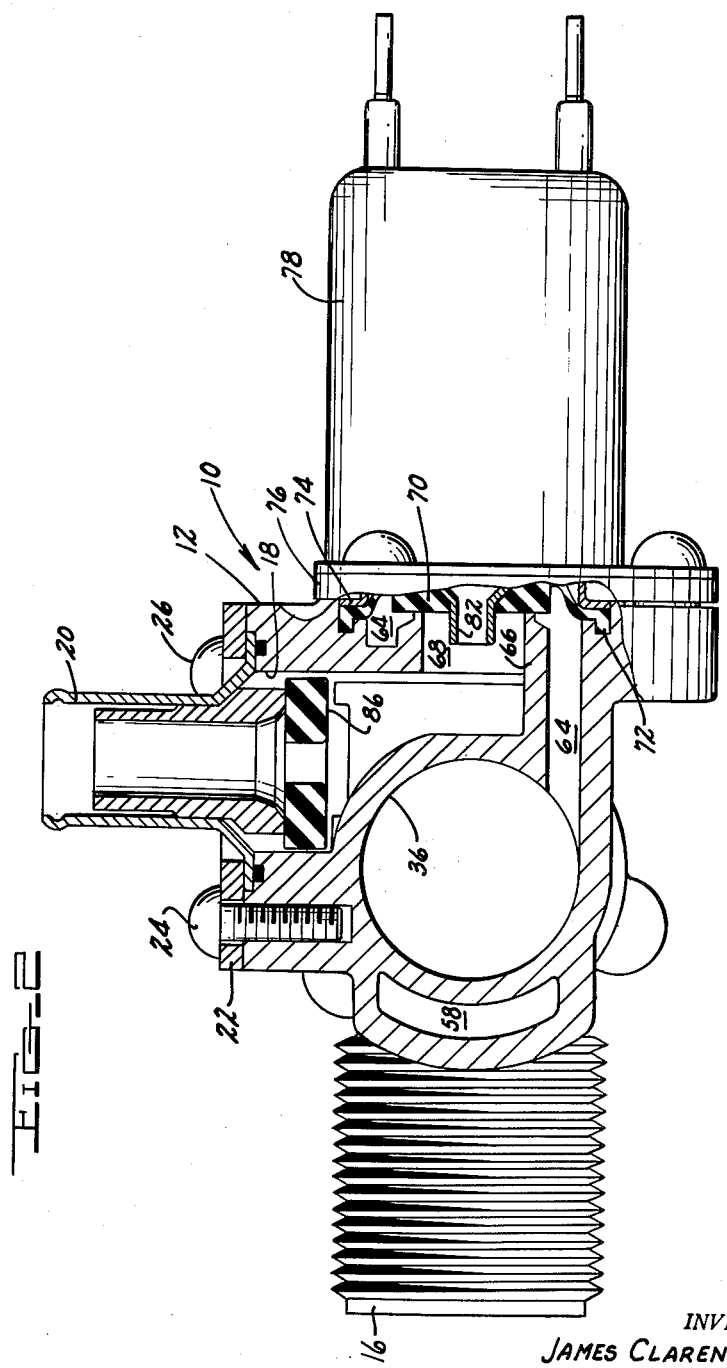
FIGURE 2 is a top view partial section of the lower half of the view of FIGURE 1, showing the chamber to receive the internal thermostatic adjustment means and the outlet assembly in particular.

Referring now to the drawings, a detailed description of the invention will be given. The mixing valve 10 has a valve body 12 on one side of which is an inlet 14 for hot fluid and spaced therefrom, an inlet 16 for cold fluid. Another side of the valve body 12 has a single discharge outlet 18 shown in FIGURE 2. An outlet member 20 is secured to the valve body 12 by a retainer 22 and fastening means shown representatively as bolts 24 and 26; however, any other suitable fastening means may be used.

The hot fluid inlet 14 has a shoulder 28 on which to seat a screen element (not shown). The hot fluid inlet 14 communicates with annular passageway 32 the outer wall of which is formed by cylindrical portion 33 open to one end of the valve body 12 and the inner wall of which is formed by one end of the cylindrical slide valve or metering piston 34 centrally positioned in said cylindrical portion 33. The annular passageway 32 also opens to the end of the valve body 12 and the interior of the cylindrical portion 33 forms a part of the valve mixing chamber 36.

At the outer end of the cylindrical portion 33 is a shoulder 38 on which spring seat member 40 is seated with suitable sealing means therebetween. Spring seat member 40 is secured thereto by support member and retainer 42, which in turn has fastening means shown representatively as bolts 44, 46 and 48. The spring seat member 40 also defines an end wall for both the mixing chamber 36 and the annular passageway 32. Further, it provides a valve closure seat for one end of the metering piston 34 and thereby allows annular passageway 32 to be sealed off from communication with the mixing chamber 36; and thus, prevents any hot fluid from passing through the mixing valve 10.

The cold fluid inlet 16 has a central boss 50 on which is attached a check valve assembly 52 by fastening means shown representatively as bolt 54. The check valve operates in the conventional manner to allow the flow of fluid into the mixing valve via the apertures 56. Thus, when the flow is in this direction, the pressure raises rubber annulus 57 of the check valve 52 off the seat and permits cold fluid to flow.

The cold fluid inlet 16 communicates by way of passageway 58 with annular passageway 60 whose outer wall is defined by the cylindrical portion 33 of valve body 12 and whose inside wall is defined by the other end of the metering piston 34 which slides to allow the annular passageway 60 to communicate with the mixing chamber 36. The position of the metering piston relative to annular passageways 32 and 60 controls the relative flow of hot and cold fluids and thus also the temperature of the resultant fluid in the mixing chamber 36. The positioning of this metering piston 34 is determined by the adjustable thermostatic device 62 and more fully described elsewhere herein.

The mixed fluid passes out of the mixing chamber 36 into a partially annular passageway 64 which opens to one end of the valve body 12 and extends around an integral sleeve 66. The sleeve 66 also opens to the end of the valve body 12 and the interior forms a mixed fluid passageway 68 communicating with the discharge outlet 18.

The outer end of the valve sleeve 66 forms a seat for a pressure operated diaphragm valve 70. The latter has sealing engagement with the open end of the valve body 12 in a groove 72 outward of the passageway 64. A closure cap 74 abuts the outer side of the diaphragm valve 70 adjacent the outer margin thereof and maintains said diaphragm in sealing engagement with the groove 72 and also closes the open end of valve body 12. A retainer member 76 fits over the outer lip of the closure cap 74 and over the end of valve body 12. A solenoid 78 is mounted on the outer side of the retainer member 76.

A valve member 80 which is the armature of the solenoid 78 engages a central orifice 82 in the diaphragm valve 70 for closing such orifice 82 and maintaining the diaphragm valve 70 closed. Bleeder passages 84 are formed in the diaphragm to allow the fluid to pass from one side of the diaphragm to the other and equalize the pressure on both sides of the diaphragm when the central orifice 82 is closed by the valve member 80. When this occurs, the valve will be closed by pressure on the topside of said diaphragm because the surface area exposed to fluid pressure on the top is greater than the surface area exposed to fluid pressure on the underside thereof. Upon energization of the solenoid 78, the valve member 80 will move out of engagement with the central orifice 82, relieving pressure from the top or outer side of said diaphragm, and allowing said diaphragm valve to be opened by the pressure of fluid on the underside of the diaphragm. This will open the end of passageway 68 for the passage of fluid therethrough from the mixing chamber 36 into the outlet 18.

In order to avoid pressure surges and in order to keep the volume of fluid discharged per unit time substantially constant, a flow control annulus 86 of a conventional type is positioned in the discharge outlet 18 in communication with the mixing chamber 36. This flow control device is in the form of a flat annulus and is made of a resilient material such as rubber.

The temperature of the mixed fluid depends on the relative flow of hot and cold fluids as permitted by the metering piston 34 to flow into the mixing chamber 36 from the spaced annular passageways 32 and 60 respectively. In the piston position shown in FIGURE 1, the cold fluid is entirely shut off and only hot fluid would be allowed to flow into the mixing chamber when the solenoid 78 is open to permit flow of fluid through the mixing valve 10. Metering position 34 is slidably positioned in the cylindrical portion 33 by a collar member 88 also positioned in cylindrical portion 33 between annular passageways 32 and 60 so that each end of the collar member 88 forms an end wall to annular passageways 32 and 60. The outer circumference of collar member 88 is made fluid tight with the cylindrical portion 33 by sealing means 90, and the inner circumference of collar member 88 is made fluid tight with the metering piston 34 by sealing means 92. Seated in the inside periphery of the collar member 88 on the shoulder for holding the sealing means 92 is an indented bushing 94 on which the cylindrical metering piston 34 is permitted to slide back and forth along its axis.

The inside periphery of the metering piston 34 has an integral raised ridge 96 near its outer end and a detachably affixed raised ridge 98 near the inner end. Seated on the integral ridge 96 is a coil spring 100 used as resilient means to seat the outer periphery of a perforated cup member 102 against the detachably affixed raised ridge 98. The slide valve assembly includes the metering piston 34, internal coil spring 100, detachable ridge ring 98, and perforated seating cup 102, all of which are positioned in the collar 88 in the cylindrical portion 33. The slide valve assembly is positioned axially between the inner coil spring 104 and the externally adjustable thermostatic device 62. Note that the coil spring 104 is seated at one end in the spring seat member 40 and at the other end around the inner hub of the cup member 102. The externally adjustable thermostatic device 62 has a rod or piston member 106 extending through a central hole in the cup member 102 and presses on the cup member 102 from a shoulder 108 formed by rod member 106.

Figure 1:
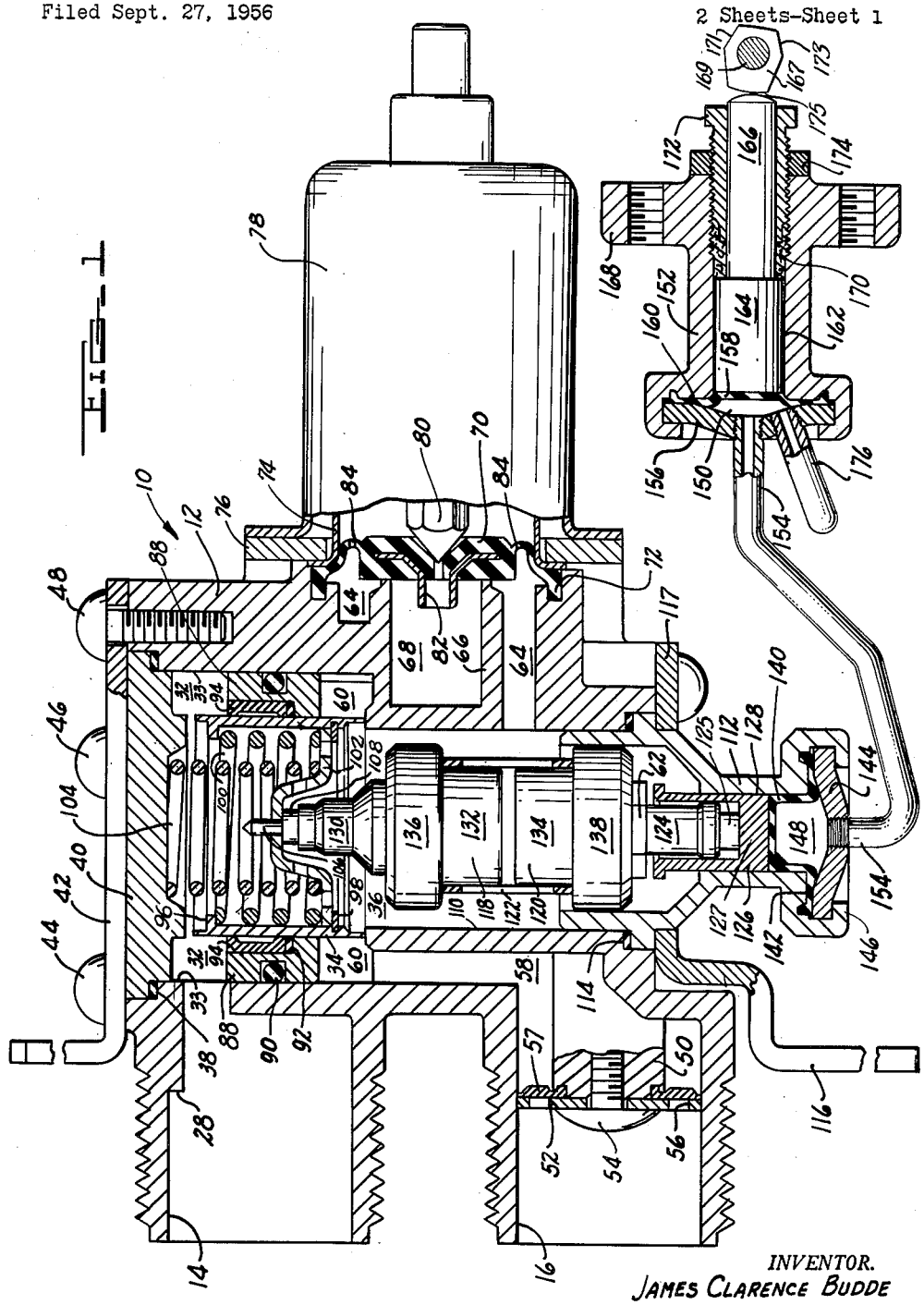
FIGURE 1 shows a partially sectioned view of the valve assembly, including a sectioned view of a preferred external and internal thermostatic adjustment means of this invention.

The position of the metering piston 34 relative to the spaced annular passageways 32 and 60 is determined by the position and temperature of the externally adjustable thermostatic device 62 positioned in part within cylindrical portion 33 and extending through the cylindrical portion 110 which portions combine to define the mixing chamber 36. The supporting body 112 of the external member of the device 62 shown in FIGURE 1 is rigidly seated on a shoulder 114 formed at the outer end of the cylindrical portion 110, with suitable sealing means therebetween and secured thereto by the support bracket 116 which has an annular retaining portion 117 fitting over an outer lip portion of the supporting body 112 of the device and over the end of the valve body 12.

The internal member of the device 62 comprises two thermostatic power elements 118 and 120 mounted in axially opposed positions in a supporting bracket 122, which is open to permit the flow of fluid around it into its central parts. This thermostatic power element assembly is slidably positioned in the mixing chamber 36 by having its piston guide portion 124 inserted inside piston member 126 with the power element piston 125 abutting against end wall 127; member 126 is power cylinder 128 in the supporting body 112 of the external member. Power element 118 is positioned with piston member 106 extending through the central hole in cup member 102 and with piston shoulder 108 resting on the cup member 102. Each of the power elements 118 and 120 is preferably of the type wherein a temperature sensitive deformable medium (not shown) is carried within their casings 132 and 134, respectively, and which acts against a deformable member (not shown) in their cylinders 136 and 138, respectively, to extend their respective pistons 106 and 125 from their respective cylinders 136 and 138 and thereby cause the thermostatic power element assembly to lengthen and contract along its axis in response to changes in temperatures which effect at least one of the temperature sensitive deformable media, and thereby move the slide valve assembly. The internal construction of these type power elements may be seen more fully in U.S. Patent No. 2,636,776. The deformable medium contained in power element 118 is sensitive to a different temperature range than that of the deformable medium contained in power element 120. The functioning of these two internal thermostatic control elements is further described elsewhere herein.

The piston member 126 which houses the rod end 124 of the power element 120, is motivated in a direction out of the valve body 12 by the resilient means 104 pressing it against a deformable diaphragm 140 resting on a grooved shoulder 142 at the outer end of the supporting body 112. Retaining member 144 presses the outer circumference of the diaphragm 140 against the shoulder 142 and into the groove therein to form a fluid tight union therebetween. The retainer 144 is secured to the shoulder 142 by means of the overlapping flange 146 of the supporting body 112. The central portion of the flexible diaphragm 140 extends somewhat into the power cylinder 128 to be in contact with the piston 126 and thereby forms a cavity 148 between it and the retainer member 144 for an hydraulic fluid. This fluid can be of any suitable nature. A preferred fluid is a silicone base oil, for they are economically available, show good flow characteristics and are relatively inert. Further, since oils of this type do not tend to wet metals or hydrocarbon-base diaphragm materials, they are preferred because they show less tendency to diffuse or leak out at the joints even when subjected to relatively high hydraulic pressures.

The hydraulic fluid cavity 148 is in communication with a hydraulic fluid cavity 150 in the mechanical actuating member 152 through the hydraulic tube 154 which is connected in a fluid tight manner to the retainer 144 at one end and to a similar retainer 156 in the mechanical actuating member 152. Bounding the side of the cavity 150 opposite the retainer 156 is a flexible diaphragm 158 which rests on a grooved shoulder 160 about the periphery of a power cylinder 162. As with the diaphragm 140 in the supporting body 112, the actuator diaphragm 158 is of a suitable flexible material so that it can extend somewhat into the power cylinder 162.

Positioned against the actuator diaphragm 158 in the power cylinder 162 is the mechanically actuated piston 164. To this actuating piston 164 is connected a drive shaft member 166, which in turn is adapted to be connected to a suitable mechanical driving member (not shown) such as an automatic timing cam or gear mechanism on a washing machine. The mechanical actuating member 152 has a flanged portion 168 which is adapted to be detachably affixed to the washing machine or other machines in such a manner that the drive shaft 166 is aligned with its driving member (not shown). This connection is made usually at the factory. The outer end of power cylinder 162 has a threaded portion to receive an adjustable stop element 170 held in place by adjustable plug or hollow bolt element 172 and locked in place by lock nut 174.

In preparing this external adjustment means for use in automatically positioning the metering piston 34, a vacuum is first created in cavities 148 and 150 and hydraulic tube 154 by evacuating this system through charging tube 176 also connected in a fluid tight manner to retainer 156. Then a suitable hydraulic fluid is charged into the evacuated cavities 148 and 150 and hydraulic tube 154 through the charging tube 176, after which the charging tube is sealed off in a fluid tight manner, such as by pinching it off. After the fluid valve 10 and its mechanical actuating member 152 have been mounted in the particular washing machine and connected with the automatic or semiautomatic timing device, adjustment on the actuating piston 164 is made usually at the factory by means of the adjustable stop element 170 which is controlled by the plug element 172 and locked in place by lock nut 174. The externally adjustable thermostatic valve device of this invention is then ready for automatic or semiautomatic use in obtaining at least three preselected fluids ranging from cold to a maximum hot temperature.

In operating the externally adjustable means, when it is desired to have a cold fluid temperature, the actuating or timing device (not shown) would mechanically push drive shaft 166 and thereby piston 164 until it is in a certain preselected position in the power cylinder 162. For illustration purposes the connection between this timing means and shaft 166 is shown as a cam 167 carried on a roller shaft 169. Cam 167 is provided with three lobes 171, 173 and 175, each lobe serving to adjust shaft 166 axially into a different location so as to produce three different mixed water temperatures. Thus, movement of shaft 166 causes the diaphragm 158 to force the hydraulic fluid out of cavity 150 through hydraulic tube 154 into cavity 148. This in turn causes diaphragm 140 to push piston member 126 against the piston 125 which forces the slidably mounted thermostatic power element assembly to press against the slide valve assembly to which it is operably connected. Metering piston 34 is thus moved to substantially fully open the annular passageway 60 to be in communication with the mixing chamber 36 and substantially fully close the opening between annular passageway 32 and the mixing chamber 36. In this position of metering piston 34, and when solenoid 78 is open and fluid is allowed to flow through the valve and out through the flow control annulus 86, only cold fluid will be allowed to flow; the hot fluid being substantially completely cut off. Under these cold conditions neither thermostatic element undergoes expansion; both are in their contracted positions.

Again if a maximum hot fluid temperature is desired, the drive shaft 166 and piston 164 of the external actuator 152 are permitted to move a predetermined distance from the "cold" position described above along the power cylinder 162 toward its threaded end. Spring member 104 in the opposite end of the mixing chamber 36 then can force the metering piston 34 in a direction to substantially fully open the hot fluid passageway 32, substantially fully close the cold fluid passageway 60 and cause the thermostatic assembly to slide into a different predetermined position in the mixing chamber 36. As hot fluid flows over the thermostatic power elements the one which is sensitive to an intermediate temperature range will expand first. It is preferred that element 118 be of this nature. This will tend to close any space gaps which may remain between the piston 124 and the retracted piston 164, but the cold passageway 60 will remain substantially closed because of the external positioning made on the thermostatic valve device 62. However, as the hot fluid heats up the other thermostatic element (preferably element 120) to where it reaches its expansive range, it will begin to expand. As it does, the thermostatic assembly has been so positioned by the external adjustment means 152 that the thermostatic assembly will tend to close the hot fluid opening 32 and at the same time open the cold fluid opening 60. A controlled cooling effect will take place and steady maximum fluid temperature flow conditions will be reached and maintained.

Further, if an intermediate fluid temperature is desired, such as for rinsing clothes, mechanical means such as cam 167 causes shaft 166 to move piston 164 to a preselected position in power cylinder 162 which is intermediate to the two above described limiting positions. The hydraulic system thus slidably mounts the operably connected thermostatic power element assembly in an intermediate position in the mixing chamber 36. This in turn positions the metering piston 34 to allow both the cold chamber 60 and the hot chamber 32 to open into the mixing chamber 36. At this cooler temperature, the higher temperature thermostatic element (preferably element 120) will be substantially contracted and will not enter into the internal control of the mixed fluid temperature. However the lower temperature thermostatic element (preferably element 118) now has been positioned such that it will expand as the temperate fluid temperature gets too hot. In so doing the axial extension of the internal member will cause the valve member 34 to tend to close the hot fluid passageway 32 and open the cold fluid passageway 60; thus internally controlling the intermediate temperature of the mixed fluid.

When more than one intermediate mixed fluid temperature is desired in an automatic valve, three or more thermostatic elements may be adjustably positioned in the mixing chamber 36 and adjusted by the external control means. Further, although separate thermostatic power elements have been shown in FIGURE 1, this invention is not to be limited thereto, for it is contemplated that one or more single thermostatic power elements having therein two or more temperature sensitive deformable media each of which is sensitive to different temperature range may be used in the externally adjustable thermostatic valve of this invention.

Still further although the invention has been particularly described with respect to an hydraulic means for externally adjusting the internal positions of the thermostatic elements, it is not to be limited thereto, for any suitable external adjustment means such as a mechanical connection, an hydraulic capillary tube, a Bowden wire power element, or the like may be employed.

The invention claimed is:

1. A mixing valve for mixing relatively hot and cold fluids comprising a valve body having a central mixing chamber; spaced hot and cold fluid inlets in said valve body in communication with said mixing chamber; an outlet in communication with said mixing chamber; an externally adjustable thermosensitive power device within said mixing chamber; said device including a first motive material thermosensitive to one temperature range and a second motive material thermosensitive to a lower temperature range; valve means connected to said thermosensitive device for controlling the rate of flow of hot and cold fluids into said mixing chamber; and power device stop means adjustable to first, second and third preselected locations; whereby (1) when said stop means is positioned in said first location the thermosensitive power device is positioned toward the hot fluid inlet so as to be ineffective to move the valve means to a position opening said hot inlet, even at low mixing chamber temperatures (2) when said stop means is positioned in said second location the power device is positioned in an intermediate location and the second motive material is thereby effective to reciprocate the valve means in a manner to control the mixing chamber temperature at an intermediate value, and (3) when said stop means is positioned in said third location the power device is positioned in a location away from the hot inlet and the first motive material is thereby effective to allow the valve means to open the cold inlet at very high mixing chamber temperatures.

2. A mixing valve for mixing relatively hot and cold fluids comprising a valve body having a central mixing chamber, spaced hot and cold fluid inlets into said valve body communicating with said chamber through spaced annular passageways adjacent to said chamber, an outlet in communication with said chamber and having therein a flow control annulus for delivering a mixed fluid at a substantially constant flow rate and a solenoid operated shutoff valve between said chamber and said outlet, said chamber having therein a slidable thermosensitive device comprising a first thermostatic portion thermosensitive to one temperature range and a second thermostatic portion thermosensitive to a lower temperature range; said device being operably connected at one end to a valve means slidably positioned in the chamber between the said spaced annular passageways and adapted to control the rate of flow of fluids into said chamber, a stop element positioned adjacent the other end of said thermostatic device and adjustable axially of said thermostatic device to three predetermined positions, resilient means urging said thermostatic device towards said stop element, and a cam-operated hydraulic piston adapted to hydraulically position said stop element to its three predetermined positions; whereby said thermostatic device may be (1) positioned to substantially close said cold fluid inlet, and (2) positioned to allow the lower temperature thermostatic portion to substantially open both the hot and cold inlets, and (3) positioned to allow the first and second thermostatic portions to substantially close the hot fluid inlet.

3. A mixing valve for mixing relatively hot and cold fluids comprising a valve body having a central mixing chamber, spaced hot and cold fluid inlets into said valve body communicating with said chamber through spaced annular passageways adjacent to said chamber, an outlet in communication with said chamber and having therein a flow control annulus for delivering a mixed fluid at a substantially constant flow rate and a solenoid operated shutoff valve between said chamber and said outlet, said chamber having therein a slidable thermosensitive device comprising a first thermostatic portion thermosensitive to one temperature range and a second thermosensitive portion thermosensitive to a lower temperature range; said device being operably connected at one end to a valve means slidably positioned in the chamber between the said spaced annular passageways and adapted to control the rate of flow of fluids into said chamber, the other end of said device abutting against an adjustable stop element, and a mechanically actuated piston adapted to hydraulically position said stop element to three predetermined positions, whereby said thermostatic device may be (1) positioned to substantially close said cold fluid inlet and (2) positioned to allow the lower temperature thermostatic portion to substantially open both the hot and cold inlets, and (3) positioned to allow the first and second thermostatic portions to substantially close the hot fluid inlet.

4. A mixing valve for mixing relatively hot and cold fluids comprising a valve body having a central mixing chamber, spaced hot and cold fluid inlets into said valve body communicating with said chamber through spaced annular passageways adjacent to said chamber, an outlet in communication with said chamber and having therein a flow control annulus for delivering a mixed fluid at a substantially constant flow rate and a solenoid operated shutoff valve between said chamber and said outlet, said chamber having therein a slidable thermosensitive device comprising a first thermostatic portion thermosensitive to one temperature range and a second thermostatic portion thermosensitive to a lower temperature range; said device being operably connected at one end to a valve means slidably positioned in the chamber between the said spaced annular passageways and adapted to control the rate of flow of fluids into said chamber, and stop means at the other end of the device adjustable to three preselected positions to control the extent of travel of said end and to position the thermosensitive device within said chamber; said stop means comprising an hydraulic system including a first diaphragm abutting one end of said thermosensitive device, an hydraulic line leading from said diaphragm to a second diaphragm mounted in a housing remote from said valve, and a cam operated piston guided in said housing and abutting said second diaphragm, whereby said thermosensitive device may be (1) positioned to substantially close said cold fluid inlet and (2) positioned to allow the lower temperature thermostatic portion to substantially open both the hot and cold inlets, and (3) positioned to allow the first and second thermostatic portions to substantially close the hot fluid inlet.

References Cited in the file of this patent

UNITED STATES PATENTS

| | | |
|---|---|---|
| 1,499,278 | Wingfield | June 24, 1924 |
| 2,072,693 | Volkert | Mar. 2, 1937 |
| 2,396,138 | Vernet | Mar. 5, 1946 |
| 2,442,886 | Bowen | June 8, 1948 |
| 2,584,417 | Branson | Feb. 5, 1952 |
| 2,657,859 | Wangenheim | Nov. 3, 1953 |
| 2,673,038 | Vernet et al. | Mar. 23, 1954 |
| 2,754,062 | Wangenheim | July 10, 1956 |